(12) United States Patent
Oota

(10) Patent No.: US 8,757,726 B2
(45) Date of Patent: Jun. 24, 2014

(54) VEHICLE SEAT

(75) Inventor: Hiroki Oota, Inazawa (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/545,109

(22) Filed: Jul. 10, 2012

(65) Prior Publication Data

US 2013/0020841 A1    Jan. 24, 2013

(30) Foreign Application Priority Data

Jul. 19, 2011    (JP) .................................. 2011-157721

(51) Int. Cl.
    *A47C 7/74*    (2006.01)
(52) U.S. Cl.
    USPC .................................. 297/452.42; 297/452.46
(58) Field of Classification Search
    USPC .............. 297/452.42, 452.43, 452.46, 180.14
    See application file for complete search history.

(56) References Cited

U.S. PATENT DOCUMENTS

| | | | | |
|---|---|---|---|---|
| 3,331,089 A | * | 7/1967 | Ornas, Jr. et al. | ........ 297/452.47 |
| 7,802,843 B2 | * | 9/2010 | Andersson et al. | ...... 297/180.14 |
| 7,857,395 B2 | * | 12/2010 | Kikuchi et al. | .......... 297/452.47 |
| 2011/0133525 A1 | | 6/2011 | Oota | |

FOREIGN PATENT DOCUMENTS

| | | |
|---|---|---|
| JP | 2003-235676 | 8/2003 |
| JP | 2010-240240 | 10/2010 |
| JP | 2010-253242 | 11/2010 |

* cited by examiner

*Primary Examiner* — Sarah B McPartlin
(74) *Attorney, Agent, or Firm* — Greenblum & Bernstein, P.L.C.

(57) ABSTRACT

A back surface of a seat pad is elastically supported by a support member. An air groove that forms an air duct is formed in the back surface of the seat pad. The support member is formed by an airtight sheet-shaped body, and the sheet-shaped body is arranged contacting the back surface of the seat pad so as to form the air duct by closing off an open portion of the air groove.

5 Claims, 6 Drawing Sheets

VEHICLE SEAT

INCORPORATION BY REFERENCE

The disclosure of Japanese Patent Application No. 2011-157721 filed on Jul. 19, 2011 including the specification, drawings and abstract is incorporated herein by reference in its entirety.

BACKGROUND OF THE INVENTION

1. Field of the Invention

The invention relates to a vehicle seat having an air-conditioning function.

2. Description of Related Art

In a vehicle seat, the back surface of a seat pad of a seat cushion (or a seat back) is elastically supported by a support member. Also, a vehicle seat is known in which a seat cushion (or a seat back) is provided with an air-conditioning function (an air blowing function) in order to improve sitting comfort. With this air-conditioning apparatus, an air duct is provided in a back surface of the seat pad, and air for air-conditioning that is supplied from the air-conditioning apparatus is blown out from the front surface of the seat pad through the air duct. Also, in order to form the air duct in the back surface of the seat pad, an air groove is formed in the back surface of the seat pad and an open portion (i.e., a back surface side open portion) of the air groove is closed off by affixing a plate member to the back surface of the seat pad, as described in Japanese Patent Application Publication No. 2003-235676 (JP 2003-235676 A), for example.

However, when the plate member is affixed to the back surface of the seat pad, the number of component parts and the man-hours for assembly increase by an amount related to the plate member. As a result, the cost increases. Moreover, the sitting comfort may be adversely affected due to the thickness and hardness of the plate member.

SUMMARY OF THE INVENTION

The invention thus provides a vehicle seat in which an air duct is able to be provided in a back surface of a seat pad by a simple structure.

One aspect of the invention relates to a vehicle seat that includes a seat pad in which an air groove that forms an air duct is formed in a back surface of the seat pad, and a support member that elastically supports the back surface of the seat pad. The support member is formed by an airtight sheet-shaped body. The sheet-shaped body is arranged contacting the back surface of the seat pad so as to form the air duct by closing off an open portion of the air groove.

According to this structure, the support member is formed by the airtight sheet-shaped body, so the air duct is able to be formed by closing off the open portion of the air groove using this sheet-shaped body. In other words, the air duct is able to be formed on the back surface side of the seat pad by a simple structure, without increasing the number of parts.

In the vehicle seat according to the aspect described above, a protruding portion that runs along a peripheral edge portion of the open portion of the air groove and closely contacts the sheet-shaped body may be formed on the back surface of the seat pad.

According to this structure, air is able to be well inhibited from leaking out of the air duct by having the protruding portion on the back surface of the seat pad be closely contacting the sheet-shaped body.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, modes for carrying out the invention will be described according to example embodiments.

Figure 1:
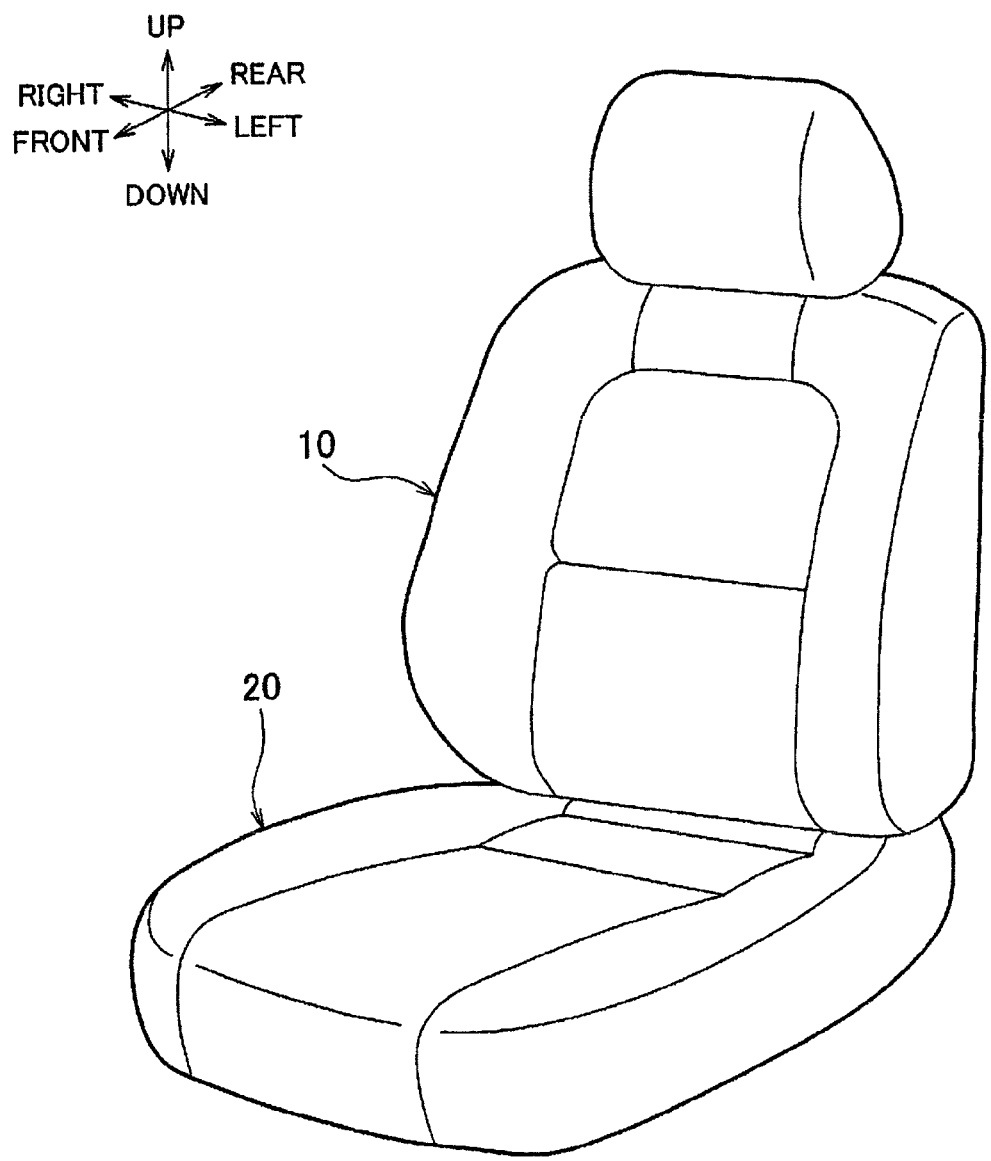
FIG. 1 is a simplified perspective view of a vehicle seat according to an example embodiment of the invention.

A vehicle seat according to an example embodiment of the invention will be described with reference to the accompanying drawings. As shown in FIG. 1, the vehicle seat includes a seat cushion 20, and a seat back 10 that is arranged via a reclining mechanism, not shown, on a rear portion of this seat cushion 20. The seat back 10 is tilt-adjustable with respect to the seat cushion, by the reclining mechanism, not shown. The seat cushion 20 includes a cushion frame 21, a support member 30, a seat pad 50, a cover 60, and an air-conditioning apparatus 70, as shown in FIGS. 2 to 4.

Figure 2:
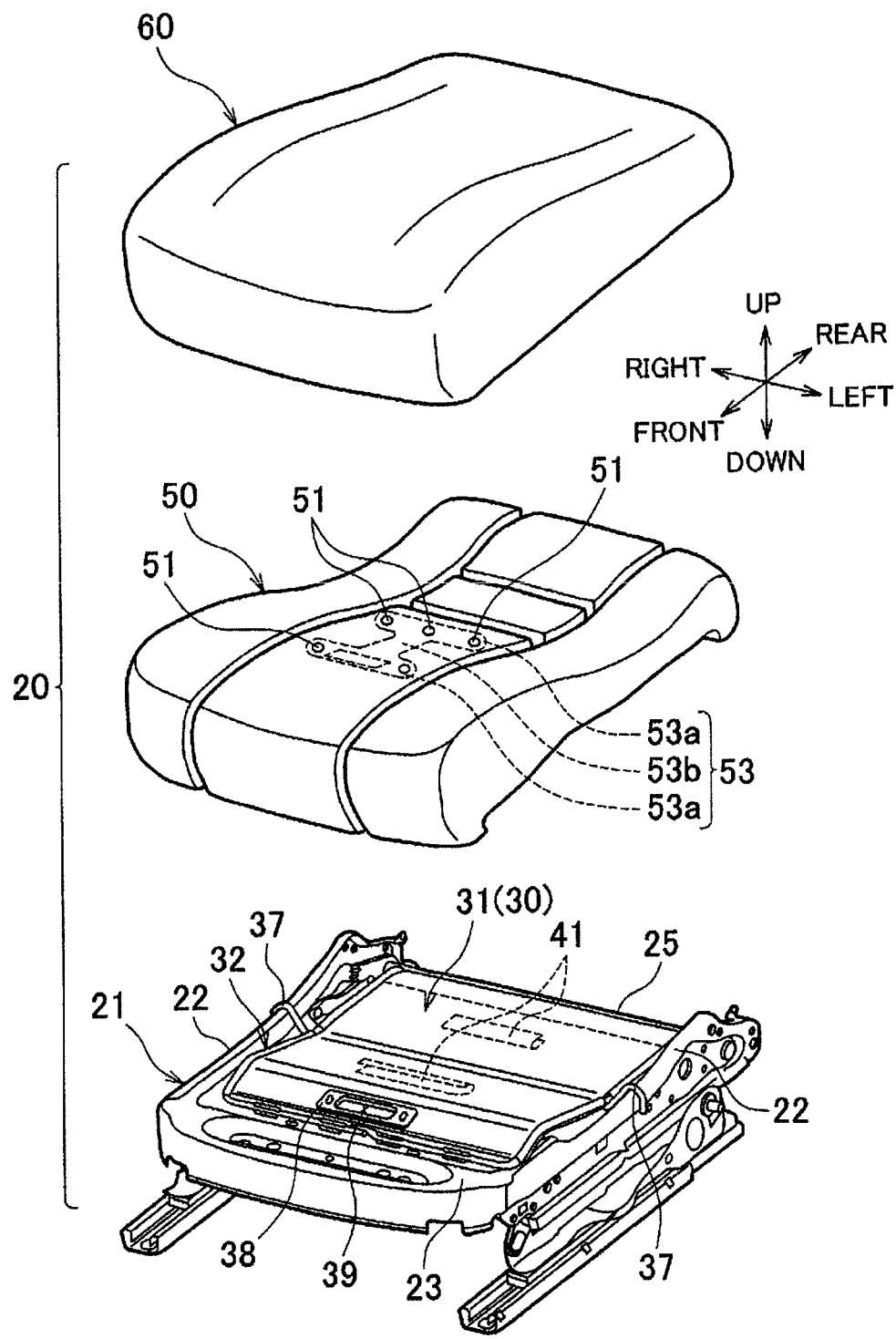
FIG. 2 is a perspective of a cushion frame, a seat pad, and a cover of a seat cushion separated from one another.

As shown in FIG. 2, the cushion frame 21 includes left and right side frame portions 22, a front frame portion 23 arranged extending between front end portions of these side frame portions 22, and a rear frame portion 25 arranged extending between rear end portions of the side frame portions 22. The front frame portion 23 is formed by a panel, and the rear frame portion 25 is formed by a pipe.

Figure 3:
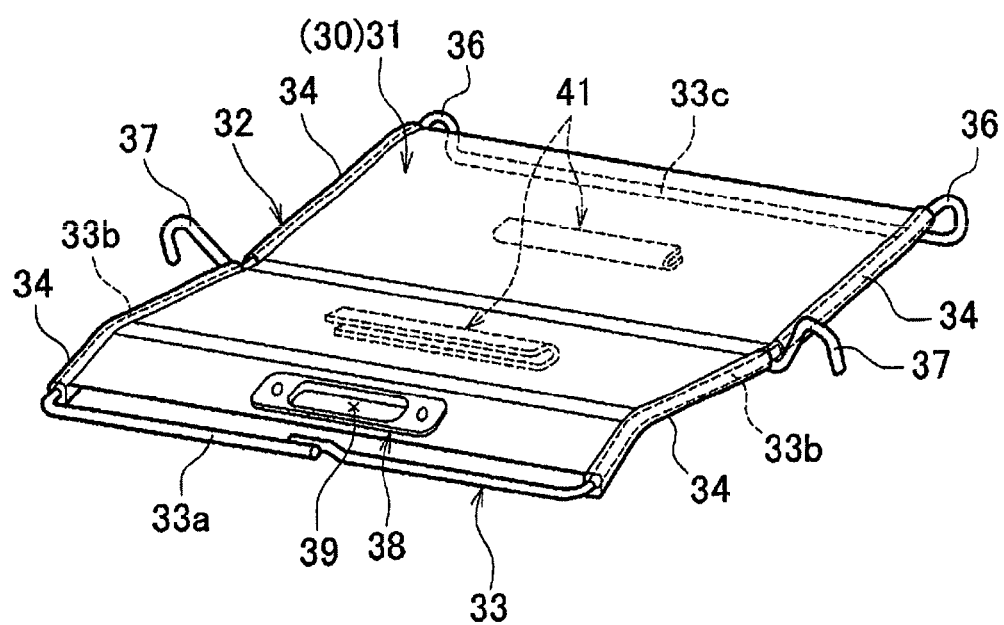
FIG. 3 is a perspective view of a sheet-shaped body as a support member held taut over a support frame body.
Figure 5:
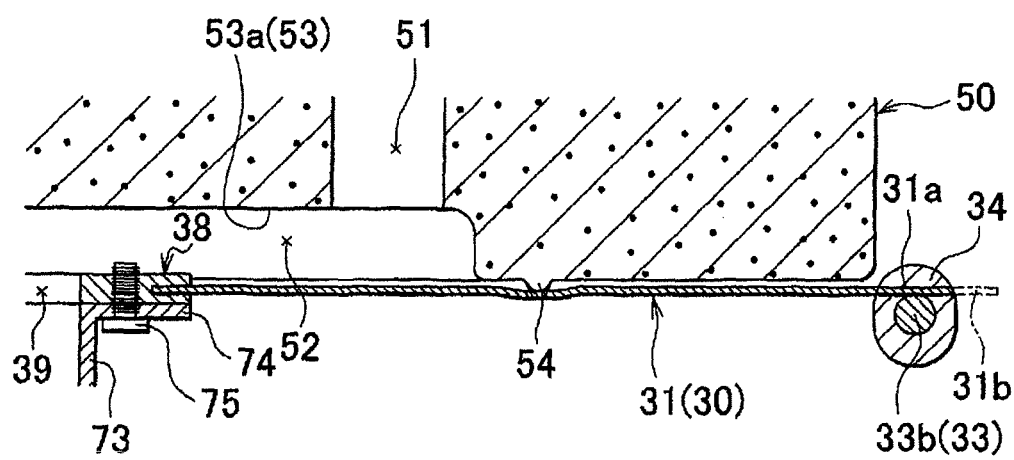
FIG. 5 is a sectional view taken along line V-V in FIG. 4.

As shown in FIGS. 2 and 3, the support member 30 is formed by a sheet-shaped body 31 that is formed by airtight cloth material coated (on its surface) with resin (thermoplastic synthetic resin material). The sheet-shaped body 31 that is held to a support frame body 32 is arranged on the cushion frame 21. As shown in FIG. 3, the support frame body 32 includes a metal bar 33 that is bent into a square shape and both ends of which are joined together by welding, and a resin molded portion 34 that is formed so as to cover an outer periphery of left and right side frame portions 33b of the metal bar 33. The resin molded portion 34 is made of thermoplastic resin material. Also, as shown in FIG. 5, right and left end edges 31a of the sheet-shaped body 31 are embedded in the resin molded portion 34, and the sheet-shaped body 31 is held taut with no slack in it.

Figure 4:
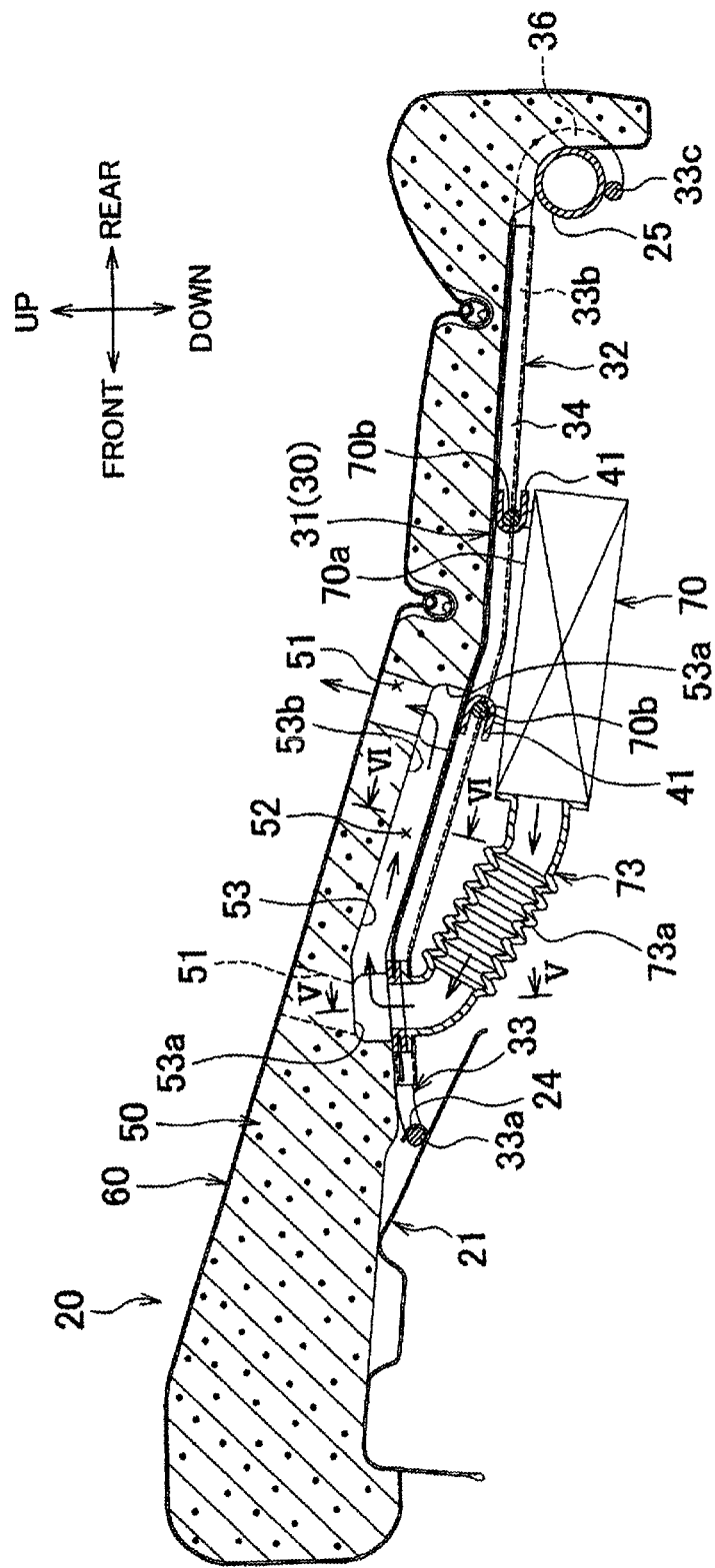
FIG. 4 is a side sectional view of the cushion frame, the seat pad, and the cover of the seat cushion assembled together.

Also, as shown in FIGS. 3 and 4, rear retaining portions 36 are formed by bending the metal bar 33 at boundary portions between left and right end portions of a rear frame portion 33c and the rear end portions of the side frame portions 33b. Also, as shown in FIGS. 2 and 3, a hook-shaped side retaining portion 37 is attached by welding or the like to a center portion in the longitudinal direction of each side frame portions 33b of the metal bar 33. Also, as shown in FIGS. 2 to 4, the rear retaining portions 36 of the support frame body 32 are hooked on a rear frame portion 25 of the cushion frame 21, the side retaining portions 37 of the side frame portions 33b are hooked on the left and right side frame portions 22 of the cushion frame 21, and a front frame portion 33a is retained by left and right retaining pieces 24 of the front frame portion 23 of the cushion frame 21. In this way, the sheet-shaped body 31 is attached to the cushion frame 21.

Figure 7:
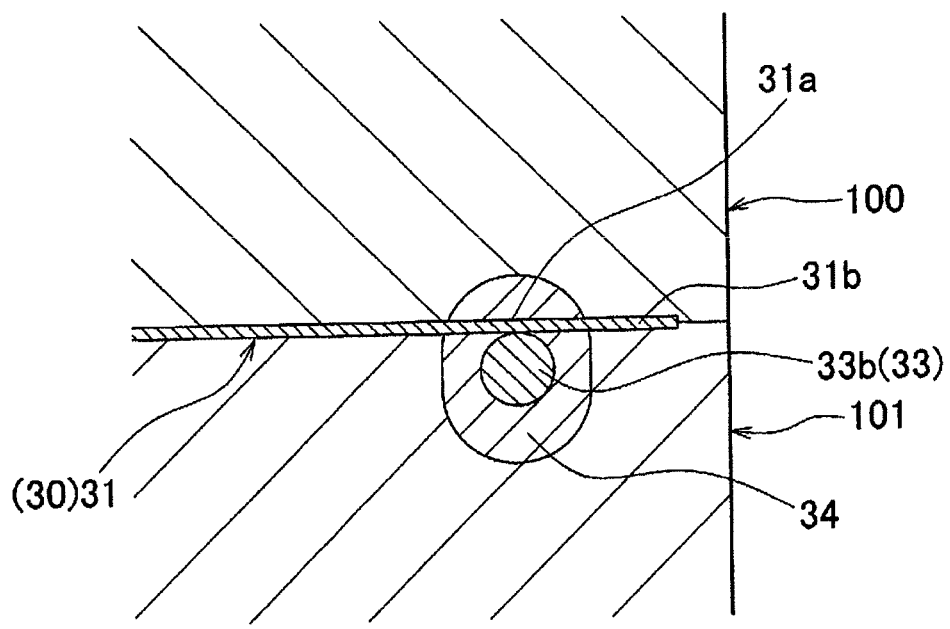
FIG. 7 is a simplified view of a forming die for molding a resin molded portion on an outer periphery of both side frame portions of the support frame body on both side edges of the sheet-shaped body.

In this example embodiment, the metal bar 33 is set into a cavity of a pair of forming dies 100 and 101, as shown in FIG. 7. Also, when the pair of forming dies 100 and 101 are closed, extended portions 31b of left and right end edges 31a of the sheet-shaped body 31 are sandwiched between die mating surfaces of the forming dies 100 and 101. Here, thermoplastic synthetic resin material in a molten state is poured into the cavity of the pair of forming dies 100 and 101. As a result, the resin molded portion 34 is formed on both side frame portions 33b of the metal bar 33, and at the same time, the left and right end edges 31a of the sheet-shaped body 31 are integrally fused and joined in a state embedded in the resin molded portions 34. Also, the sheet-shaped body 31 is held taut with no slack in it between the resin molded portions 34 of the support frame body 32.

Also, in this example embodiment, in addition to a cavity that corresponds to the resin molded portion 34, a cavity that corresponds to a hole frame body 38, and cavities that correspond to hooked members 41, are also formed between the pair of forming dies 100 and 101. The hole frame body 38 is made with thermoplastic synthetic resin material that has an air inflow hole 39 for air-conditioning in a center portion in the left-right direction of a front portion of the sheet-shaped body 31. The hooked members 41 are hooks that are made of thermoplastic synthetic resin material for attaching an air-conditioning apparatus (such as a blower) 70, that will be described later, to a front portion and a rear portion of a lower surface of the sheet-shaped body 31. Also, the hole frame body 38 and the hooked members 41 are simultaneously formed at the same time that the resin molded portions 34 of the metal bar 33 are formed. The extended portions 31b of the left and right end edges 31a of the sheet-shaped body 31 are removed after the resin molded portions 34 are formed (see FIG. 3).

The seat pad 50 is a molded article of urethane foam. The back surface of the seat pad 50 is elastically supported by the sheet-shaped body 31 that serves as the support member 30, and the front surface of the seat pad 50 is covered by the cover 60 that is breathable. As shown in FIGS. 2 and 4, an air groove 53 that forms an air duct 52 is formed in the back surface of the seat pad 50. This air groove 53 is open to the back surface of the seat pad 50, and includes a plurality of lateral groove portions 53a that extend in the left-right direction, and a longitudinal groove portion 53b that extends in the front-back direction and is communicated with the center portions in the left-right direction of the lateral groove portions 53a. The lateral groove portion 53a may also be singular. Also, a plurality of outlet holes 51 that are communicated with the air groove 53 are formed in the seat pad 50.

Figure 6:
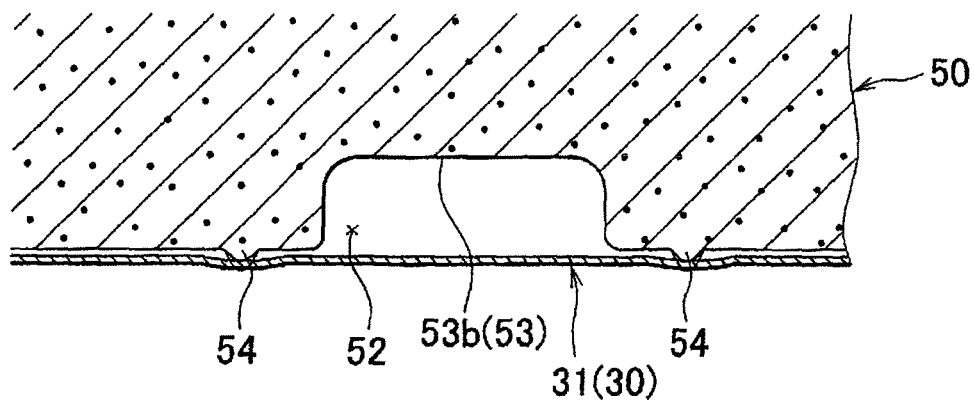
FIG. 6 is a sectional view taken along line VI-VI in FIG. 4.

Also, in this example embodiment, a protruding portion 54 that runs along a peripheral edge portion of the open portion of the air groove 53 and closely contacts the sheet-shaped body 31 is formed on the back surface of the seat pad 50, as shown in FIGS. 5 and 6. Also, when the seat pad 50 is arranged such that the protruding portion 54 elastically contacts the surface of the sheet-shaped body 31, the open portion of the air groove 53 is closed off by the sheet-shaped body 31. As a result, the air duct 52 is formed. In this state, the center portions in the left-right direction of the lateral groove portions 53a that are positioned on the front side are communicated with the inflow hole 39 of the hole frame body 38 of the sheet-shaped body 31, as shown in FIG. 5.

Also, in this example embodiment, the air-conditioning apparatus 70 for blowing air for air-conditioning into the air duct 52 is arranged below the sheet-shaped body 31, as shown in FIG. 4. In this example embodiment, U-shaped suspending portions 70b are mounted so as to protrude on a front portion and a rear portion of an upper surface of a main body case 70a of the air-conditioning apparatus 70. Also, the air-conditioning apparatus 70 is attached below the sheet-shaped body 31 by these suspending portions 70b being retained by the hooked members 41. Also, a duct member 73 extends from an outlet of the air-conditioning apparatus 70. A connecting flange 74 that is formed on a tip end of this duct member 73 is attached to the lower surface of the hole frame body 38 by a clip 75 (or a screw), as shown in FIG. 5. The duct member 73 has a bellows structure portion 73a that is able to expand and contract.

When the air-conditioning apparatus 70 is operating, air for air-conditioning that is supplied from the air-conditioning apparatus 70 through the duct member 73 is supplied to the air duct 52. Then the air for air-conditioning is blown out from the plurality of outlet holes 51 in the surface of the seat pad 50 through the cover 60. Now, the support member 30 that elastically supports the back surface of the seat pad 50 is formed by the airtight sheet-shaped body 31, so the air duct 52 is able to be formed by closing off the open portion of the air groove 53 in the back surface of the seat pad 50 using this sheet-shaped body 31. In other words, the air duct 52 is able to be formed on the back surface side of the seat pad 50 by a simple structure, without increasing the number of parts.

Also, in the example embodiment, the protruding portion 54 is formed along the peripheral edge portion of the open portion of the air groove 53 in the back surface of the seat pad 50. Air is able to be well inhibited from leaking out of the air duct 52 by having this protruding portion 54 be elastically compressed against, and therefore closely contacting, the upper surface of the sheet-shaped body 31.

The invention is not limited to the example embodiment described above, and may be carried out in various modes without departing from the scope of the invention. For example, in the example embodiment described above, the air duct 52 is formed in the back surface of the seat pad 50 of the seat cushion 20 of the vehicle seat, but an air duct may also be formed in the back surface of the seat pad of the seat back 10. Also, in the example embodiment described above, the protruding portion 54 is formed along the peripheral edge portion of the open portion of the air groove 53 in the back surface of the seat pad 50, but the protruding portion 54 does not necessarily have to be provided. Also, in the example embodiment described above, the seat pad 50 is formed by a molded article of foam urethane, but the invention may also be carried out when the seat pad is made of breathable nonwoven fabric. In this case, outlet holes that communicate the air groove in the back surface of the seat pad with the front surface do not have to be provided. Also in the example embodiment described above, the sheet-shaped body 31 that forms the support member 30 is formed by cloth material that is coated (on its surface) with resin (thermoplastic synthetic resin material), but the sheet-shaped body 31 that forms the support member 30 may also be formed by an airtight resin sheet.

What is claimed is:
1. A vehicle seat comprising:
a seat pad in which an air groove that defines an air duct is provided in a back surface of the seat pad; and a support member that elastically supports the back surface of the seat pad, wherein the support member is an airtight sheet-shaped body that is stretched over a support frame body disposed below the sheet shaped body in the vehicle seat, and the sheet-shaped body contacts the back surface of the seat pad so that an open portion of the air groove is closed off and the air duct is defined.

2. The vehicle seat according to claim 1, wherein a protruding portion that runs along a peripheral edge portion of the open portion of the air groove and closely contacts the sheet-shaped body is provided on the back surface of the seat pad.

3. The vehicle seat according to claim 1, wherein the air groove includes a plurality of lateral groove portions extending in a seat width direction and a longitudinal groove portion extending in a seat front-rear direction.

4. The vehicle seat according to claim 1 further comprising:
a cushion frame having a front frame portion and a rear frame portion, wherein
a front frame portion of the support frame body is retained by the front frame portion of the cushion frame, and
a rear frame portion of the support frame body is retained by the rear frame portion of the cushion.

5. The vehicle seat according to claim 1, wherein a length of the support frame body in a seat front-rear direction is greater than a length of the air duct in the seat front-rear direction.

\* \* \* \* \*